United States Patent
Rangarajan et al.

(10) Patent No.: US 9,860,671 B2
(45) Date of Patent: Jan. 2, 2018

(54) METHOD AND APPARATUS FOR PROVIDING SAFETY SERVICES RELATING TO MOBILE DEVICES

(71) Applicant: Verizon Patent and Licensing Inc., Basking Ridge, NJ (US)

(72) Inventors: Jagannath K. Rangarajan, Irving, TX (US); Muhammed Shaphy, Irving, TX (US); Abhijit Chandek, Irving, TX (US); Ebenezer Bardhan, Tamil Nadu (IN); Shachi Naren, Tampa, FL (US); Nityanand Sharma, Tampa, FL (US); Harold Rex Slay, Jr., Valrico, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 600 days.

(21) Appl. No.: 13/784,332

(22) Filed: Mar. 4, 2013

(65) Prior Publication Data
US 2014/0248864 A1    Sep. 4, 2014

(51) Int. Cl.
*H04M 3/00* (2006.01)
*H04W 4/00* (2009.01)

(52) U.S. Cl.
CPC .................................. *H04W 4/001* (2013.01)

(58) Field of Classification Search
CPC ...................................................... H04W 4/001
See application file for complete search history.

(56) References Cited

U.S. PATENT DOCUMENTS

| | | | |
|---|---|---|---|
| 9,055,407 B1 * | 6/2015 | Riemer | H04M 1/72569 |
| 2007/0072553 A1 * | 3/2007 | Barbera | 455/67.11 |
| 2009/0318121 A1 * | 12/2009 | Marumoto | 455/414.1 |

* cited by examiner

*Primary Examiner* — Keith Fang

(57) ABSTRACT

An approach for providing feature configuration management is described. A service controller platform, monitors at least one environmental parameter of a mobile device; determines an event according to a threshold, the event being based on at least a change in the at least one environmental parameter; determines a feature configuration setting associated with at least one of the threshold or the event according to a device profile, wherein the device profile specifies a feature configuration setting that includes at least one of locking the mobile device, limiting access to at least one predetermined application, or disabling the mobile device; and causes the mobile device to change a feature configuration according to the feature configuration setting.

17 Claims, 9 Drawing Sheets

METHOD AND APPARATUS FOR PROVIDING SAFETY SERVICES RELATING TO MOBILE DEVICES

BACKGROUND INFORMATION

Wireless networking technologies offer users the convenience of mobility and the ease of connection to a network. The high availability of mobile devices can be advantageous in most instances; however, under certain circumstances, such availability can be disruptive or even pose a safety hazard, depending on the particular activity the user is currently engaged. Users tend to multitask and divide their attention among more than one activity. Thus, mobile devices often can become a distraction to a user, for example, when the user is driving or performing other critical activities. Because mobile device users generally control which applications/functionalities to use at a given moment, it is becoming increasingly difficult to manage the personal and/or business uses of a mobile device. Consequently, inefficiencies in productivity as well as the rise in hazardous conditions can result.

Therefore, there is a need for an approach that provides convenient and efficient management of feature configuration of a mobile device in different environments.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF PREFERRED EMBODIMENTS

An apparatus, system, method and software for providing management of device feature configurations are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
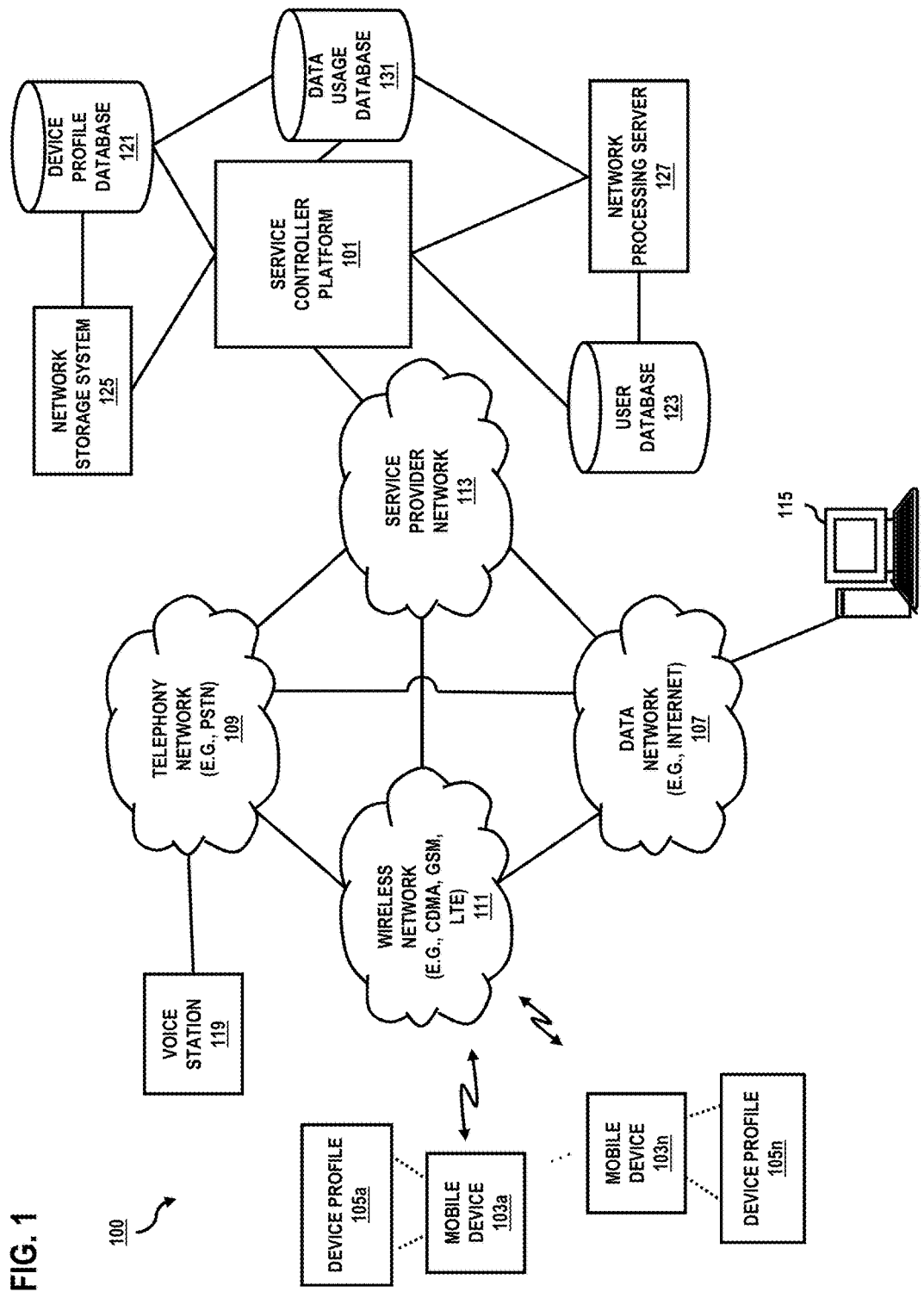
FIG. 1 is a diagram of a system capable of providing management of mobile device configuration in different environments, according to one embodiment.

FIG. 1 is a diagram of a system capable of providing management of features configuration of a mobile device, according to one embodiment. For the purpose of illustration, system 100 employs a service controller platform 101 that is configured to provide device feature management services for user devices (e.g., mobile devices) based on the physical environment experienced by these devices. As used herein, feature management services of the service controller platform 101, in certain embodiments, refers to services that involve management of a feature configuration setting of a mobile device. Feature configuration setting, in some embodiments, refers to different a mode of operation of the device that includes controlling user access to applications, locking the user device (e.g., prevent access to functions/operation of the device), and disabling the user device (e.g., turning off the device, putting the device into sleep mode, etc.).

It is contemplated that the mode of operation can be governed by the environment that the mobile device is operating within. The environment can be characterized by the use of one or more environmental parameters. Environmental parameter refers to, for example, time (e.g., time of day), geographic location, speed, motion, data usage, as well as any environmental information related to a mobile device. Also, the feature configuration setting can be associated with a threshold of an environmental parameter. By way of example, the threshold can include the following: (i) a predetermined value or range of values; and/or (ii) a dynamic value or range of values, that may change based on, for example, context information. The context information, for example, may include additional information associated with the mobile device and/or mobile user associated with the device profile. For example, context information may include conditions (e.g., weather or traffic) associated with the geographic location of the mobile device, speed limit associated with the geographic location of the mobile device, driving record of the mobile user, or a combination thereof. In this manner, the service controller platform 101 can effectively control access to application(s) on a mobile device based on the device environment.

The feature configuration services may, for instance, manage feature configurations of one or more user devices (e.g., mobile devices 103 (or mobile devices 103a-103n)) over one or more networks (e.g., data network 107, telephony network 109, wireless network 111, service provider network 113, etc.). According to one embodiment, services including feature management may be part of managed services supplied by a service provider (e.g., a wireless communication company) as a hosted or subscription-based service made available to users of the mobile devices 103 through a service provider network 113. For instance, the service controller platform 101 can manage a device profile associated with a mobile device 103a. The device profile can specify one or more feature configuration settings to be employed at different threshold(s), environmental parameter to be monitored, as well as any information relating to configuration of a graphical user interface (GUI). The management of the features of such profiles, in certain embodiments, can be performed at a group level. For example, the feature configurations of a mobile device can be managed according to a group profile to which the device profile belongs. For instance, devices associated with a common user account can be configured based on a group profile. In this manner, a single configuration can be applied to multiple devices, which provides a more efficient management approach.

As shown, the service controller platform 101 may be a part of or connected to the service provider network 113. According to another embodiment, the service controller platform 101 may be included within or connected to the mobile devices 103, a computing device 115, etc. While specific reference will be made thereto, it is contemplated that the system 100 may embody many forms and include multiple and/or alternative components and facilities.

In certain embodiments, the service controller platform 101 may include or have access to device profiles stored in a profile database 121. For example, the service controller platform 101 may access the profile database 121 to acquire and manage the device profile 105 associated with the mobile devices 103. Device profile may include information relating to the feature configuration services, such as the device feature configuration setting, threshold, environmental parameters to be monitored, etc. The device profile may include device profile information, such as user information, data, and the like. User information may, for instance, include usernames, passwords, preferences (e.g., configuration and layout of a graphical user interface), personal contract information, history information, and the like. Such data may also include user data, data relating to one or more applications associated with the mobile devices 103 including, organizational data, behavior data (e.g., usage of applications), and the like. The data usage may be stored in a data usage database 132. Some or all of the device profile 105 information may be configured to enable use by multiple phone manufactures and operating systems.

In certain embodiments, the service controller platform 101 may include or have access to device profile 105 stored in the profile database 121 and/or the user account information stored in the user database 123. For example, the service controller platform 101 may access the user database 123 to authenticate logon credentials and determine devices and device profiles 105 associated with the user account. The service controller platform 101 may access the data usage database 132 to determine data usage.

In various embodiments, an application may operate on the mobile device 103 in connection with the service controller platform 101 as an extensible feature, a web-service, an applet, a script, an object-oriented application, or the like to enable processing, analyzing, detecting, and the like, of content items (e.g., audio, video, image, text, etc.), metadata, and the like for presenting at least one user interface element and other processes and applications. Further, the service controller platform 101 and the application may utilize one or more service application programming interfaces (APIs)/integrated interface, through which communication, media, content, and information (e.g., associated with users and services, content, POIs, bookmarks, etc.) may be shared, accessed and/or processed.

As shown, the service controller platform 101, in certain embodiments, may utilize a server-based approach using a network storage system 125 (hereinafter NSS 125), and a network processing server 127 (hereinafter NPS 127). Under this scenario, the NSS 125 stores profiles and handles the distribution of such profiles. For example, the NSS 125 may create and modify profiles stored in the device profile database 121 to incorporate changes detected by mobile device 103a. Also, the NPS 127 can process the various datum to determine which profile or profiles should be active. It is contemplated that the functions of the NSS 125 and NPS 127 may be subsumed by the service controller platform 101.

As mentioned, recent developments have increased the usage of mobile devices by enterprises (e.g., businesses, organizations, etc.) for business applications, for example. Additionally, these users can employ applications/process on these devices for personal use, rather than business during business hours (i.e., business environment). Consequently, such behavior may cause distractions in the work place or inefficiencies in work productivity. Additionally, the use of devices in certain environments, for example, while driving, may pose a safety hazard.

To address this issue, the system 100 of FIG. 1, via service controller platform 101, introduces the capability to control feature configuration setting of a mobile device in view of the environment currently experienced by the device. For example, configuration setting changes may be made according to a threshold and/or an event. By way of example, the service controller platform 101 can monitor at least one environmental parameter (e.g., speed) of a mobile device 103, and control the feature configuration of the mobile device based on changes in the at least one environmental parameter according to a device profile. The service controller platform 101 can monitor the environmental parameter to determine whether a certain event has transpired. In one embodiment, an event (or configuration triggering event) refers to an activity that triggers a change in an at least one parameter according to, e.g., a threshold value. For example, an event may refer to a speeding event in which a change in speed of a device corresponds to and/or exceed a speed threshold. The service controller platform 101 may cause the feature configuration setting of the mobile device specified in the device profile. It is contemplated that the environmental parameter may operate in conjunction with the applications that are being executed on the device to determine whether configuration settings should be modified. For instance, even though the mobile device (e.g., device 103a) is within a vehicle that results in the device 103a moving beyond a certain speed, if the application is a navigation program, the device 103a need not disable the program. However, under this condition, programs or applications, such as email, short messaging service (SMS), video streaming, or a program that may unduly distract the user, can be disabled.

Moreover, the service controller platform 101 may be configured to determine context data to dynamically change the threshold associated with the device profile of the mobile device 103. Furthermore, the service controller 101 may be configured to support group profiles that include a community of mobile devices 103 to support managing of the feature configuration setting and associated threshold and/or event at a group level. The community can be formed or designated, for example, based on organization (e.g., job responsibilities, title, etc.), compliance with employer's mobile device policy, usage, driving record, etc. In this way, employers may efficiently manage the mobile devices of their employees.

By way of example, mobile devices 103 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 103 may support any type of interface for supporting the presentment or exchange of data. In addition, mobile devices 103 may facilitate various input means for receiving and generating information to monitor environmental parameters, including touch screen capability, keyboard and keypad data entry, voice-based input mechanisms, sensor data ((e.g., GPS, accelerometer, gyroscope, thermometer, etc.) to determine environmental (e.g., atmospheric) conditions surrounding the mobile device 103, location information, and various other information from a range of sensors that may be available on one or more devices), information blue-tooth capable devices (e.g., a vehicle in which the mobile device is located), and the like. Any known and future implementations of mobile devices 103 are applicable. It is noted that, in certain embodiments, the mobile devices 103 may be configured to determine and/or receive context data using a variety of technologies—i.e., near field communication (NFC), Bluetooth, infrared, etc.

In some embodiments, the service controller platform 101, the mobile devices 103, and other elements of the system 100 may be configured to communicate via the service provider network 113. According to certain embodiments, one or more networks, such as the data network 107, the telephony network 109, and/or the wireless network 111, may interact with the service provider network 113. The networks 107-113 may be any suitable wireline and/or wireless network, and be managed by one or more service providers. For example, the data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 115 may be any suitable computing device, such as a VoIP phone, skinny client control protocol (SCCP) phone, session initiation protocol (SIP) phone, IP phone, personal computer, softphone, workstation, terminal, server, etc. The telephony network 109 may include a circuit-switched network, such as the public switched telephone network (PSTN), an integrated services digital network (ISDN), a private branch exchange (PBX), or other like network. For instance, voice station 119 may be any suitable plain old telephone service (POTS) device, facsimile machine, etc. Meanwhile, the wireless network 111 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 107-113 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that the networks 107-113 may include components and facilities to provide for signaling and/or bearer communications between the various components or facilities of the system 100. In this manner, the networks 107-113 may embody or include portions of a signaling system 7 (SS7) network, Internet protocol multimedia subsystem (IMS), or other suitable infrastructure to support control and signaling functions.

Figure 2:
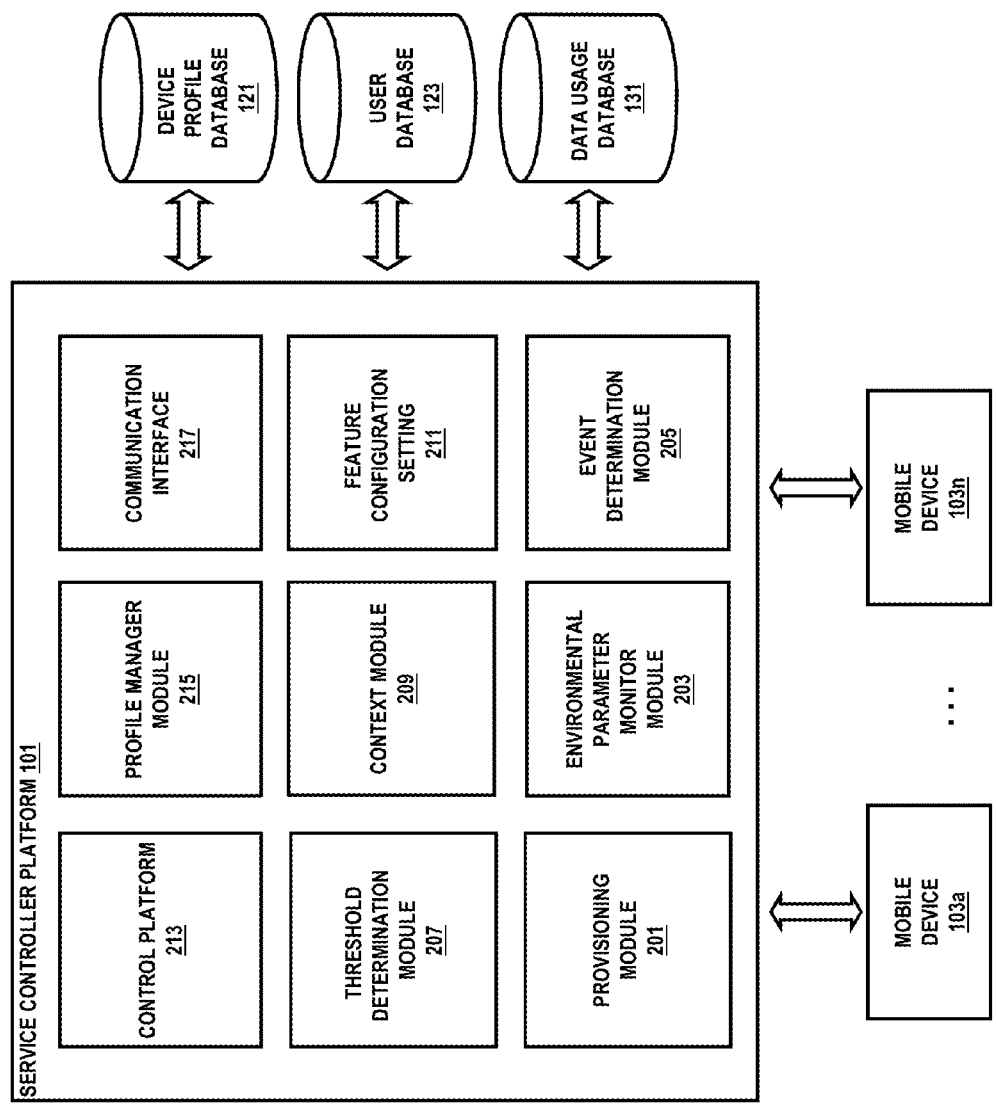
FIG. 2 is a diagram of the components of the service controller platform used in the system of FIG. 1, according to one embodiment.

FIG. 2 is a diagram of the components of the service controller platform used in the system of FIG. 1, according to one embodiment. The service controller platform 101 may comprise computing hardware (such as described with respect to FIG. 4), as well as include one or more components configured to execute the processes described herein for providing management of feature configuration settings of the system 100. It is contemplated that the functions of these components may be combined in one or more components or performed by other components of equivalent functionality. In one implementation, the service controller platform 101 includes a provisioning module 201, an environmental parameter monitor module 203, an event determination module 205, a threshold determination module 207, a context module 209, a feature configuration setting module 211, a control module 213, a profile manager module 215, and a communication interface 217.

The provisioning module 201 may deliver a feature configuration setting to a mobile device 103 to enable management of feature configuration of the mobile device 103. In one embodiment, the provisioning module 201 may deliver a feature configuration application to a mobile device 103 to enable management of a feature configuration setting of a mobile device 103 by the service controller platform 101. The feature configuration application may include a device profile 105 for installation on the mobile device 103. The provisioning module 201 may also update, for example, the version, language settings, or type of installation for the service controller platform 101 and/or the mobile device 103.

The environmental parameter monitor module 203 may monitor one or more environmental parameters associated with mobile device 103. For instance, the environmental parameter monitor module 203 may communicate to receive and/or process sensor data from various sensors (e.g., GPS, accelerometer, gyroscope, thermometer, etc.) provided with a mobile device 103 and various other information from a range of sensors that may be available on one or more devices to determine at least one environmental parameter of a mobile device 103. For example, the sensors may detect conditions including humidity, temperature, geo-location, biometric data of the user, etc. The geo-location may be determined using, for example, a location detection technology located on the mobile device 103 (e.g., GPS technology), and location detection technology located on the one or more networks 107-113 (e.g., cell site triangulation). Additionally or alternative, the environmental parameter monitor module 203 may communicate with a vehicle in which a mobile device 103 is located to receive information, for example, (e.g., speed of the vehicle, rate of braking, etc.) relating to at least one environmental parameter of the mobile device 103. This information may be processed by the environmental parameter monitor module 203 to monitor at least one of environmental parameter of a mobile device 103 and be sent to the event determination module 205 and/or to other entities of the system 100. The environmental parameter of a mobile device 103 may be sent to the data usage module 131 for reporting and analytics. The environmental parameter monitor module 203 may monitor the environmental parameters of a mobile device 103 until the mobile device 103 is disabled (e.g., locked) or turned off.

Events may be determined by the service controller platform 101 using at least one environmental parameter determined by the environmental parameter monitor module 203. The event determination module 205 may determine an event according to a threshold based on a change in an environmental parameter. As noted, an event may be determined when the environmental parameter meets and/or exceeds a threshold. For example, an event may relate to speeding based at least in part on a change in speed of a mobile device 103, erratic driving based in at least part on a change in motion of a mobile device 103, excessive data usage based on it at least on at a change in data usage of a mobile device 103, as well as other events related to a change in environmental parameter. The event may be sent to the data usage module 131 and/or device profile database 121, for example, to be stored as part of event history.

The threshold determination module 207 may determine a threshold specific to an environmental parameter. The threshold may be predetermined and specified in the device profile 105 of a mobile device 103 stored in the device profile database 121. The threshold may be associated with a feature configuration setting. Additionally or alternatively, the predetermined threshold may be dynamically adjusted, for example, based on the context information of a mobile device 103.

The context module 209 may work with the mobile device 103 to determine context information to enable the determination of a threshold and/or feature configuration setting associated with a device profile 105.

Context information may include information relating to environment and/or usage of the mobile device 103 and/or mobile user associated with the device profile 105. The context module 209 may communicate with the data usage module 131 as well as external databases and services, for example, police databases (e.g., driving database record) and road service (e.g., road conditions, traffic, speed limits, etc. associated with the geolocation of the database), to obtain context information associated with the mobile device. As noted, it is contemplated that the context module 203 may be implemented as an external server, for example, by NPS 127.

Moreover, the context information may be used to dynamically change or adjust the threshold and/or the associated feature configuration setting. In this way, the operations of the mobile device 103 can be controlled depending on the environmental conditions, and thus, safety can be promoted when the situation involves minimizing distractions to the user in the appropriate circumstances. For example, the speed limit associated with the geolocation of mobile device 103 may cause the service controller platform 101 to configure or change a threshold value to detect a speeding event (e.g., an unsafe speed for operation of the mobile device 103 while the user may be engaged in driving a vehicle). In yet another example, the weather (e.g., rain) associated with a geolocation of mobile device 103 may cause the service controller platform 101 to react to this context information, whereby the speed threshold value may be reduced, as to ensure greater safety.

As shown, the service controller platform 101 utilizes a feature configuration setting module 211, which may determine a feature configuration setting corresponding to the event and/or threshold specified in the device profile of the mobile device 103 stored in the device profile database 121. The feature configuration setting may be configured to permanently change a feature configuration of mobile device 103, for example, by maintaining the feature configuration of the mobile device 103 after it is determined that the event has ended. Alternatively or additionally, the feature configuration setting may be configured to temporarily change a feature configuration, for example, by maintaining the feature configuration of the mobile device 103 during a period of time that an event is determined to occur (e.g., a speed of a mobile device 103 is above a threshold). The feature configuration setting may be configured to limit the accessibility of a mobile device 103, for example, by providing access to at least one predetermined application(s) accessible by a user of the mobile device 103 and/or by preventing use of the mobile device 103 by either locking the mobile device 103 or disabling the mobile device 103 (e.g., turning off the mobile device 103). For example, the feature configuration setting may allow access to only a mapping application and/or a location application when an event is determined.

According to one embodiment, the service controller platform 101 may include a control module 213 for configuring the mobile device 103 to execute a feature configuration setting. Also, the control module 213 can generate a control message that specifies the feature configuration setting determined or otherwise selected by the feature configuration setting module 211. The selected feature configuration setting regulates the feature configuration of a mobile device, for example, access to mobile device 103, such as data and associated applications. In one embodiment, the control module 213 may configure and/or update the device profile 105 provided on the mobile device 103.

According to one embodiment, the service controller platform 101 may also include a profile manager module 215 configured to manage a device profile of a mobile device 103 and group device profiles that at least one device profile of a mobile device 103. Profile manager module 215 may be configured to enable users to add, remove, or modify device profiles of mobile devices 103, data, and applications associated with a mobile device 103, as well as a group device profile. The profile manager module 215 may also coordinate storage of the feature configuration setting and threshold associated with a device profile and/or a group profile in profile database 121. Additionally, functions performed by the profile manager module 215 may be implemented as an external server, for example, by NSS 125.

The service controller platform 101 may further include a communication interface 217 to communicate with other components of the service controller platform 101, the mobile devices 103, and other components of system 100. The communication interface 217 may include multiple means of communication. For example, the communication interface 217 may be able to communicate over short message service (SMS), multimedia messaging service (MMS), internet protocol, instant messaging, voice sessions (e.g., via a phone network), email, or other types of communication. Additionally, the communication interface 217 may include a web portal accessible by, for example, mobile device 103, computing device 115 and the like.

It is contemplated that to prevent the unauthorized access, the service controller platform 101 may include an authentication identifier when transmitting signals to mobile devices 103. For instance, feature configuration settings may be encrypted, either symmetrically or asymmetrically, such that a hash value, for instance, can be utilized to authenticate received control signals, as well as ensure that those signals have not been impermissibly alerted in transit. As such, communications between the mobile devices 103 and service controller platform 101 may include various identifiers, keys, random numbers, random handshakes, digital signatures, and the like.

Figure 3:
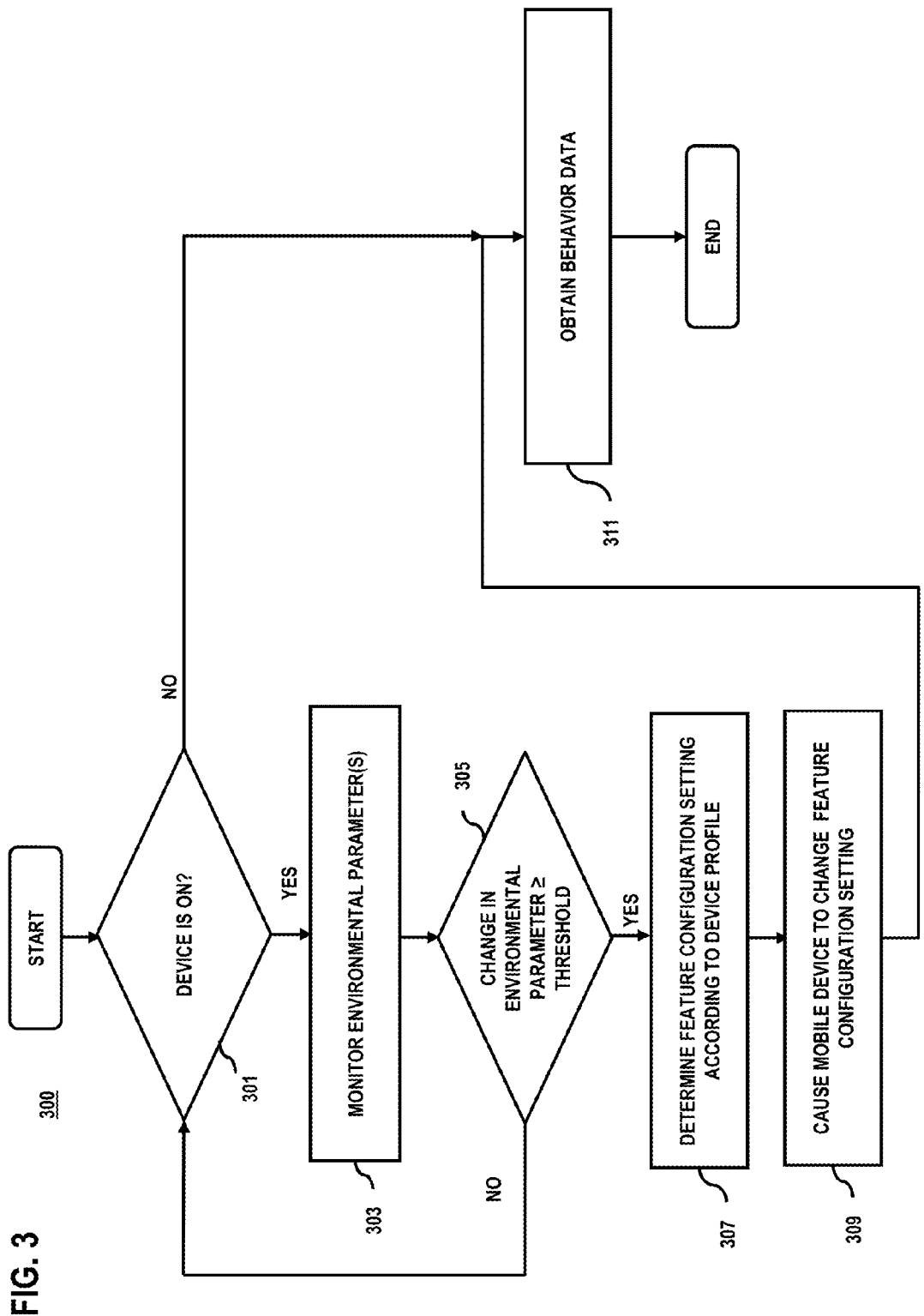
FIG. 3 is a flowchart of a process for providing feature configuration management, according to one embodiment.
Figure 8:
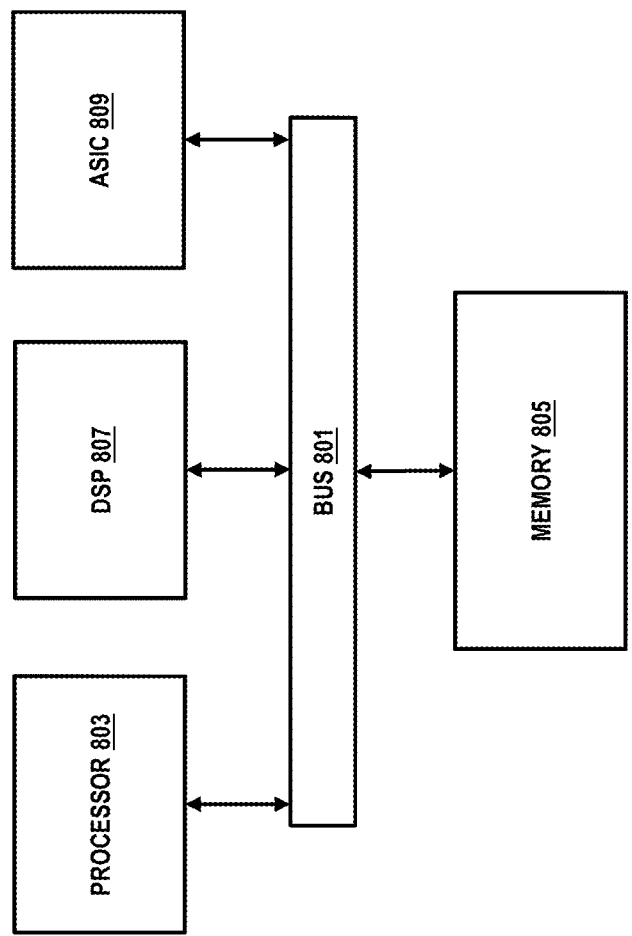
FIG. 8 is a diagram of a chip set that can be used to implement an embodiment of the invention.

FIG. 3 is a flowchart of a process for providing feature configuration management, according to one embodiment. For illustrative purpose, process 300 is described with respect to the system of FIG. 1 involving the use of thresholds to change the operational mode of a user device (e.g., mobile device 103). It is noted that the steps of process 300 may be performed in any suitable order, as well as combined or separated in any suitable manner. In one embodiment, the service platform 101 performs the process 300 and is implemented in, for instance, a chip set including a processor and a memory as shown in FIG. 8. In addition or alternatively, the mobile device 103 may perform all or a portion of the process 300.

In some embodiments, the service platform starts providing feature configuration management after, for example, installation of the service onto the mobile device 103. In some embodiments, the service may be a part of a subscription process, and the device profile provided in the device profile database 121 designated by the user (e.g., employer) may be updated periodically.

In step 301, the service controller platform 101 may determine a status of a mobile device 103. By way of example, the service controller platform 101 determines whether the mobile device 103 is turned on. If the service controller platform 101 determines that the mobile device 103 is disabled (e.g., locked) or powered off, the service controller platform 101 does not monitor environmental parameters to perform feature configuration management. If the mobile device is turned on, the service controller platform 101 may then, as in step 303, monitor at least one environmental parameter of the mobile device 103. The environmental parameter to be monitored may be based on the device profile 105 associated with the mobile device 103. For example, the user can be driving to perform a service call related to employment, whereby the movement of mobile device 103a—e.g., a GPS-enabled cellular phone, can be monitored to determine a speed of the mobile device 103. At this point, the movement of the device 103a may be monitored to determine a change in environmental parameters. Such parameters may be defined depending on the environment that is to be monitored—e.g., driving conditions, conditions in which temperature fluctuates, location, land topology, etc.

In step 305, the service controller platform 101 may determine that a change in the environmental parameter satisfies (e.g., meets and/or exceeds) at least one threshold associated with an environmental parameter and thereby determines an event. This configuration triggering event may be defined based on multiple parameters (e.g., speed and road conditions). It is contemplated that once the speed of the vehicle no longer satisfies the threshold value (e.g., for a predetermined interval), the configuration setting can revert to the original setting or some default setting. The predetermined interval can be set to avoid temporary changes in the environmental parameters to no require unnecessary setting and unsetting device configurations. For example, if the speed threshold is exceeded, but the mobile device 103 slows down briefly, this would not trigger a configuration change. Also, if the threshold is exceeded briefly, no triggering event need be generated or determined.

In some embodiments, the threshold may be provided in the device profile provided in the device profile database 121. In one embodiment, there may be more one threshold for an environmental parameter. For example, there may be more than one threshold for speed associated with a different feature configuration setting.

Figure 4:
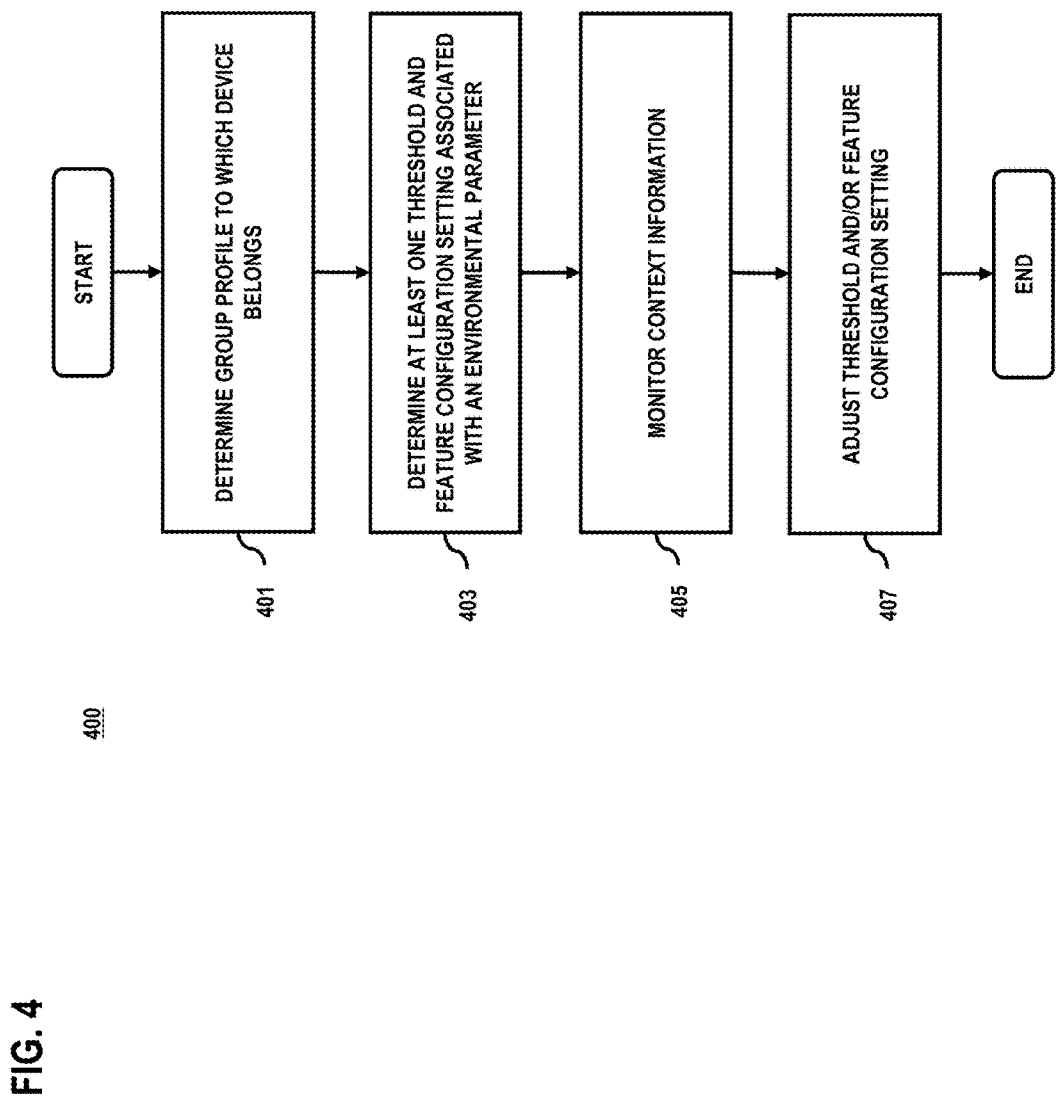
FIG. 4 is a flowchart of a process for determining a threshold utilized in configuration setting, according to one embodiment.

In one embodiment, the threshold may be predetermined the value or range of values stored in device profile. Additionally or alternatively, the threshold may be changeable based on the context information determined by the service controller platform 101. For example, the threshold for speed of a mobile device 103 may be adjusted according to weather conditions; if it is determined to be raining, the threshold for speed may be lowered to further promote safety of the user. FIG. 4 is a flowchart of a process for providing determining a threshold according to a device profile, according to one embodiment.

Once an event is determined, the service controller platform 101 may, as in step 307, determine a feature configuration setting associated with the threshold specified in the device profile. The feature configuration setting may be a safe mode in which access is limited to at least one predetermined application, locking the mobile device and/or disabling the mobile device.

It is contemplated that the service controller platform 101 may manage the feature configuration settings. In step 309, the service controller platform 101 may cause the configuration of the mobile device 103 to change to correspond to the feature configuration setting.

In one embodiment, the service controller platform 101 may obtain behavior data associated with the mobile device in step 311. It is contemplated that the service controller platform 101 may collect data regarding data usage of the mobile device. The behavior data may include data usage associated with the applications during a period of time, for example, a period of time from step 301 to for example step 305. In one embodiment, the behavior data may also include data relating to the event (e.g., the threshold exceeded, context information, etc.). This data may be caused to be stored as event history.

The above process may be repeated until the service controller platform 101 determines that the device has been disabled or locked. For example, the device or group profiles may have more than one threshold associated with an environmental parameter. By way of the example, the device profile that belongs to the first group profile may specify a second feature configuration setting that disables the device when the mobile device is determined to be moving at a speed of about 80 mph.

FIG. 4 is a flowchart of a process for determining a threshold utilized in configuration setting, according to one embodiment. For illustrative purpose, process 400 is described with respect to the system of FIG. 1. It is noted that the steps of process 400 may be performed in any suitable order, as well as combined or separated in any suitable manner. In one embodiment, the service platform 101 performs the process 400 and is implemented in, for instance, a chip set including a processor and a memory as shown in FIG. 8. In addition or alternatively, the mobile device 103 may perform all or a portion of the process 400.

In step 401, the service controller platform 101 may determine a group profile to which the mobile device 103 belongs. It is contemplated that one or more of the device profiles may be designated as a group profile, which is deployed to multiple devices sharing a common trait or job responsibilities (e.g., travel to perform some or all job responsibilities). The group profile may specify the threshold associated with an environmental parameter and/or feature configuration setting for all devices that are a part of the group profile. Once the group profile is determined, the service controller platform 101 may, as in step 403, determine at least one threshold and associated feature configuration setting for an environmental parameter specified in the device profile.

The group profiles may have different feature configuration settings for the same or different threshold. By way of an example, the device profile for a mobile device 103 that belongs to a first group profile may specify a feature configuration setting that limits access to a map and navigator applications when the mobile device is determined to be moving at a speed of about, e.g., 20 mph. On the other hand, the device profile for a mobile device that belongs to a second group profile may specify a feature configuration setting that locks the mobile device when the mobile device is determined to be moving at a speed of about 20 mph.

In one embodiment, the threshold and/or feature configuration setting may be predetermined. In other embodiment, the threshold and/or feature configuration setting may be dynamically changed based on context information.

In one embodiment, the service controller platform 101 may monitor context information in step 405. For example, the service controller platform 101 may monitor data usage, as well as external databases and services, for example, police databases (e.g., driving database record) and road service (e.g., road conditions, traffic, speed limits, etc. associated with the geolocation of the database), to obtain context information associated with the mobile device 103. In one embodiment, the collected context information may also be used as part of the event history.

The service controller platform 101, in step 407, may then adjust the threshold and/or feature configuration setting based on the collected context information. For example, the threshold for speed of the mobile device 103 may be adjusted according to speed limit associated with the location of the mobile device 103.

Figure 5:
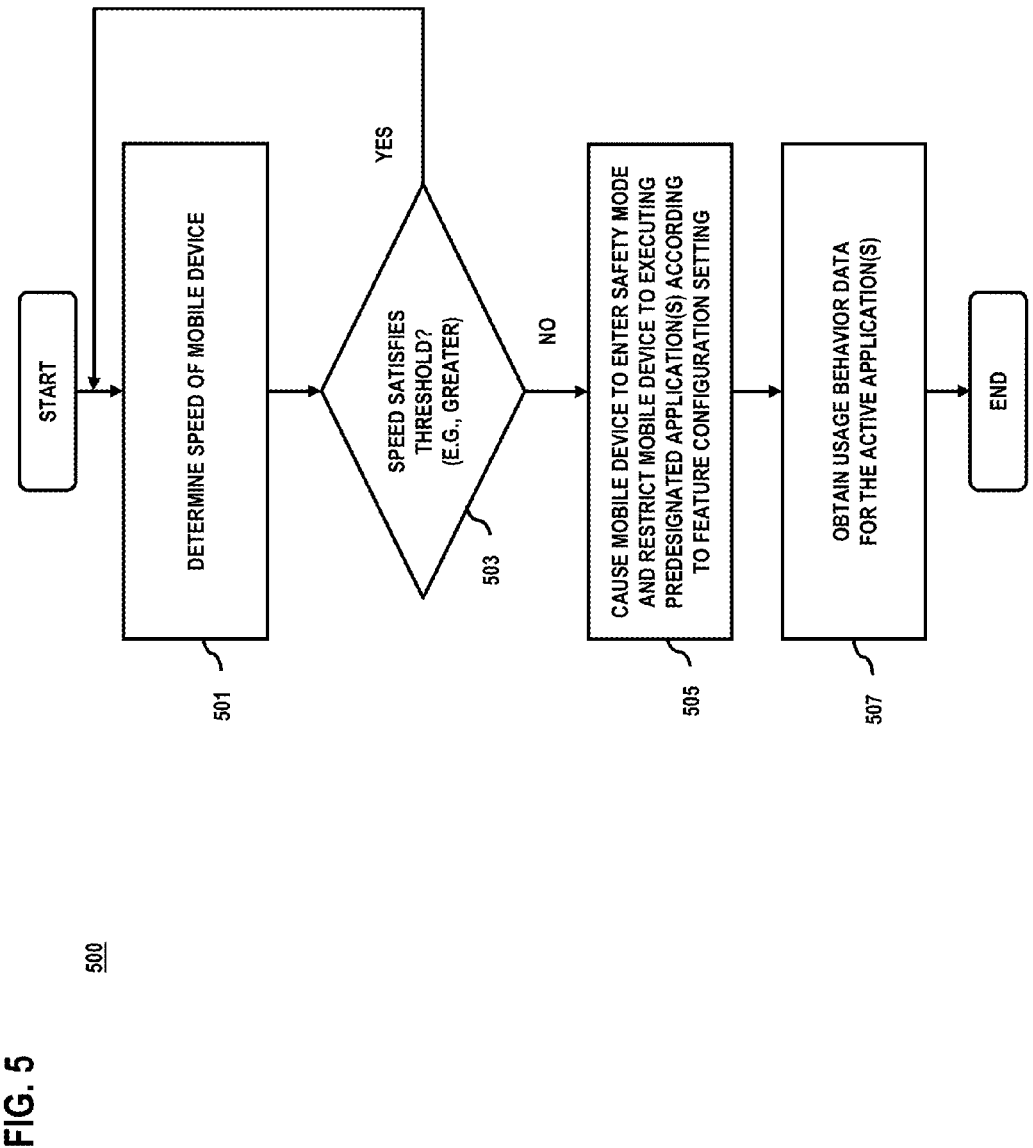
FIG. 5 is a flowchart of a process for providing feature configuration management based on speed, according to one embodiment.

FIG. 5 is a flowchart of a process to control feature configuration settings based on speed, according to an exemplary embodiment. For illustrative purpose, process 500 is described with respect to the system of FIG. 1. It is noted that the steps of process 500 may be performed in any suitable order, as well as combined or separated in any suitable manner.

In step 501, the service controller platform 101 determines speed of a mobile device 103. Typically, the device 103 may be within or affixed to a vehicle that may be in motion; also, it may be that a user is transporting the device 103 (e.g., walking, riding a bicycle, etc.). By way of example, the service controller platform 101 may monitor the location of the mobile device 103 (turned on) to determine the speed of the mobile device 103. Alternatively, the mobile device 103 itself may provide such speed information. Once the service controller platform 101 determines the speed of the mobile device, the platform 101 compares the speed to a threshold provided in the device profile 105 of the mobile device 103 (per step 503) to determine whether the speed satisfies the threshold to thereby trigger processing of a device configuration change. As discussed, the threshold may be according to the group profile to which the device profile is associated. By way of an example, the device profile for a mobile device that belongs to a first group profile may specify a feature configuration setting that limits access to communication and navigator applications when the mobile device is determined to be moving at a first speed threshold (e.g., about 20 mph). On the other hand, the device profile for a mobile device that belongs to a second group profile may specify a feature configuration setting that limits access to only navigator applications when the mobile device is determined to be moving at a second speed threshold (e.g., about 50 mph).

If the service controller platform 101 determines that the speed satisfies (e.g., exceeds and/or meets the threshold), the service controller platform 101 causes the mobile device 103 to change its feature configuration setting in step 505. The service controller platform 101 causes the mobile device 103 to enter a safety mode and restrict the mobile device to executing predesignated applications or device functions according to feature configuration setting. By way of example, an administrative user (e.g., an employer, parent, etc.) may wish to restrict social, gaming and web applications, but allow communication and/or navigator applications while driving.

In step 507, the service controller platform 101 may obtain behavior data for the active applications. The behavior data may be used for analytics.

Although the above process is described in the context of a speeding event, it is contemplated that the process has applicability to any events and environment parameters. From the above discussion, numerous advantages are provided by the various embodiments. For instance, access to applications and data can be controlled for the users, depending on the particular environment. The distractions may be limited according to environments thereby improving work productivity as well as safety.

Figure 6A:
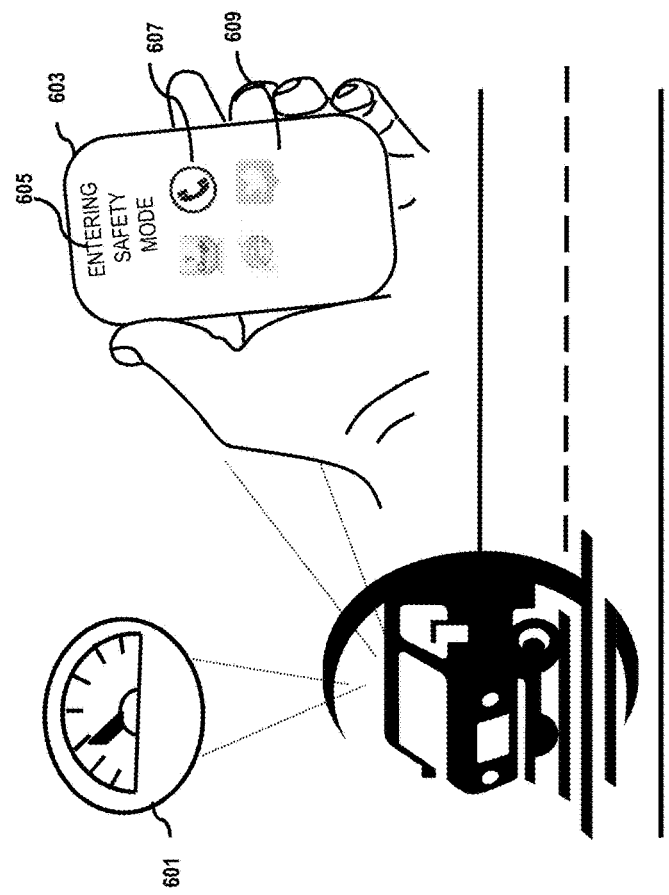
FIGS. 6A and 6B are examples of mobile devices utilized in the processes of FIG. 5, according to various embodiments.
Figure 6B:
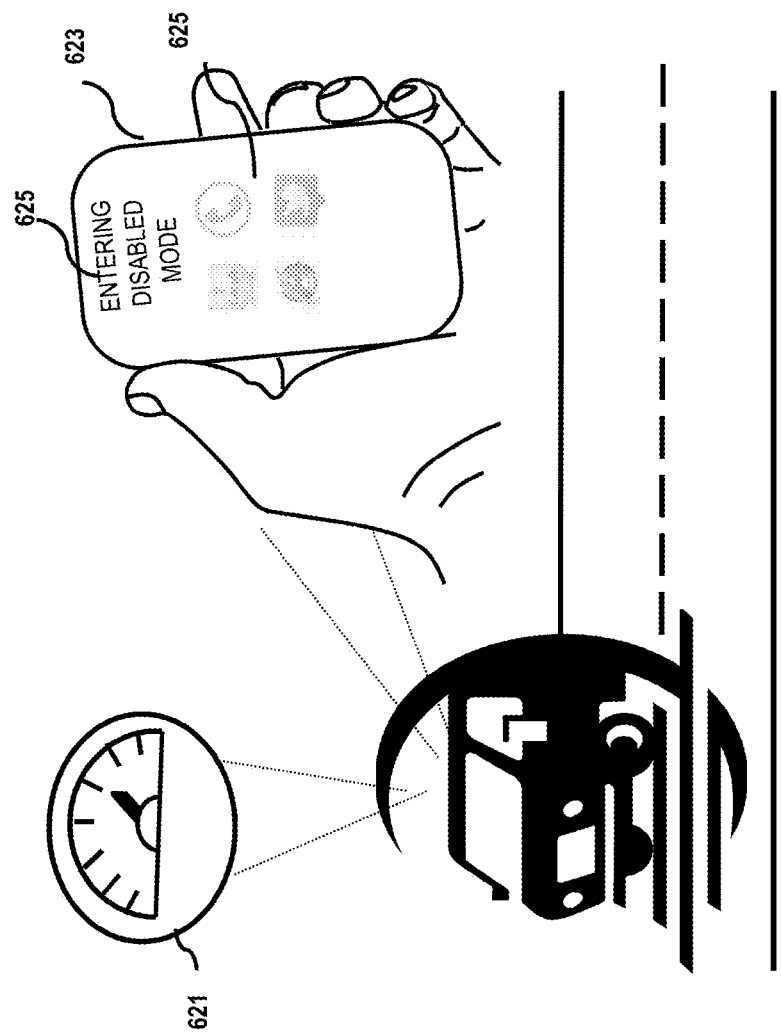

FIGS. 6A and 6B are diagrams of mobile devices utilized in the processes of FIG. 5, according to various embodiments. FIG. 6A depicts scenario in which a mobile device 603 that is entering a safety mode due to exceeding a speed threshold. In this example, the speed 601 of the mobile device 603 exceeded the speed threshold (that is considered safe for the user to operate the device 603). Based on the device profile, the mobile device 603 operates in a safety mode, as indicated by the notification message 605. It is contemplated that additional information may be provided to the user as well—e.g., the applications that are temporarily disabled. The safety mode may include limited access to predesignated applications. In this example, access to navigation and communication applications 607 are allowed, while access to other applications (e.g., social networking and web applications) 609 are disabled. The disabled applications, in this example, have changed color (e.g., the icons for the application are faded). In one embodiment, the disabled application(s) may be removed from the interface.

FIG. 6B depicts an example in which a mobile device 623 is entering a disabled mode due to exceeding a speed threshold. In one example, the mobile device 623 may belong to the same group profile as mobile device 603, and the speed 621 of the mobile device 603 exceeded a second threshold. In other example, the mobile device 623 may be belong to a different group profile than mobile device 603 and have different threshold and associated feature configuration setting. Based on the device profile, the mobile device 623 enters a disabled mode 625. The disabled mode 625 may include locking and/or turning off the mobile device 623.

The processes described herein for providing feature configuration management may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
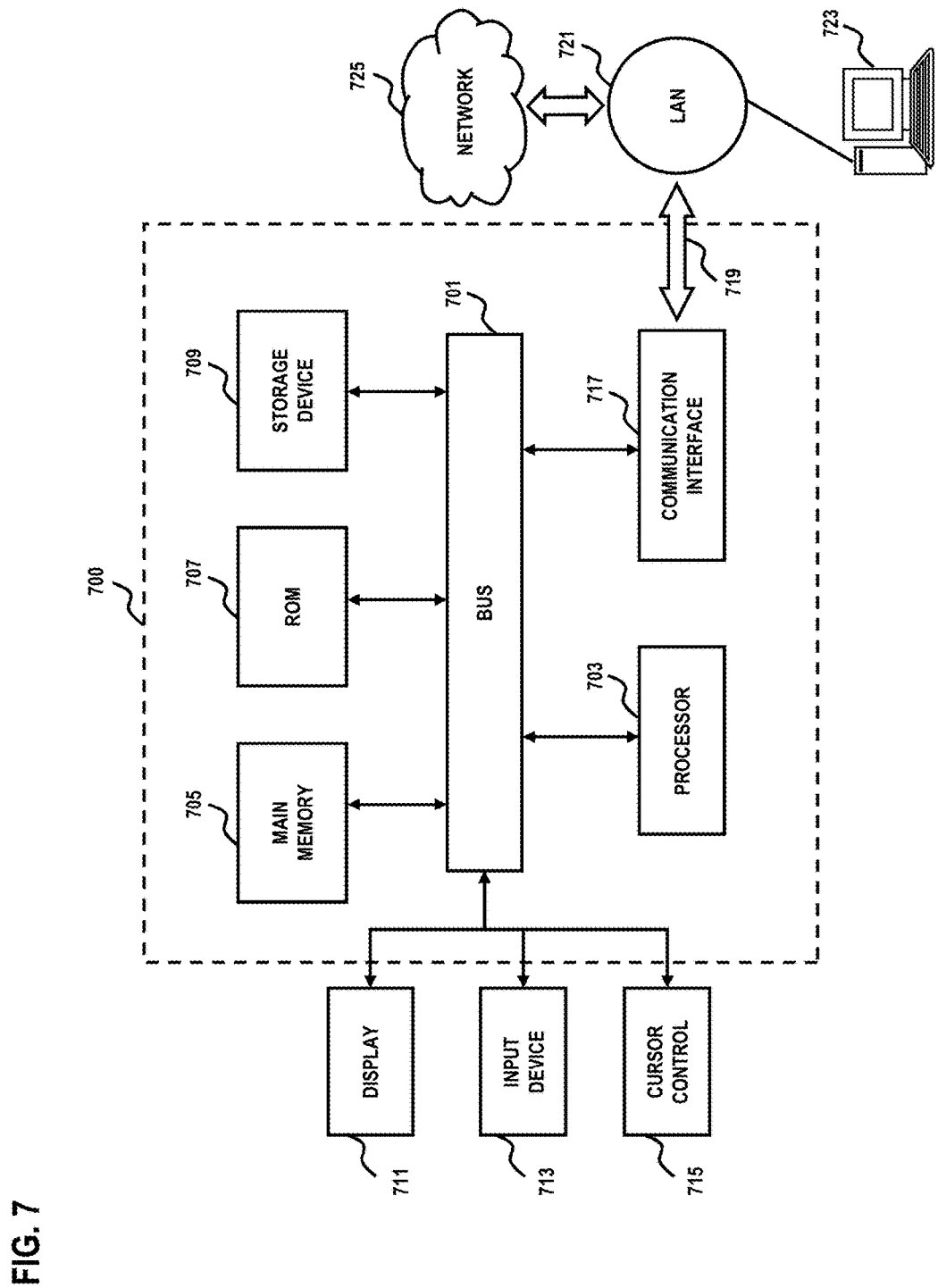
FIG. 7 is a diagram of a computer system that can be used to implement various exemplary embodiments.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk, flash storage, or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. Additional output mechanisms may include haptics, audio, video, etc. An input device 713, such as a keyboard including alphanumeric and other keys, is coupled to the bus 701 for communicating information and command selections to the processor 703. Another type of user input device is a cursor control 715, such as a mouse, a trackball, touch screen, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 illustrates a chip set or chip 800 upon which an embodiment of the invention may be implemented. Chip set 800 is programmed to enable feature configuration management as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of enabling the management of device profiles.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to enable feature configuration management access. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    monitoring at least one environmental parameter of a mobile device;
    determining context information of the mobile device, the context information comprising a legal speed limit of an automobile for a geographic location of the mobile device and weather conditions for the geographic location of the mobile device;
    determining a threshold based on the context information;
    determining an event according to the threshold, the event being further based on at least a change in the at least one environmental parameter;
    storing the event within an event history associated with the mobile device;
    determining a feature configuration setting associated with the event according to a device profile, wherein the feature configuration setting includes at least one of locking the mobile device, limiting access to at least one predetermined application, or disabling the mobile device; and
    causing the mobile device to change a feature configuration according to the feature configuration setting,
    wherein the threshold is dynamically changed based on the weather conditions.

2. A method according to claim 1, further comprising:
    updating the device profile.

3. A method according to claim 1, wherein the device profile includes additional thresholds and feature configuration settings, and the additional thresholds are predetermined or configured to be dynamically changed based on the context information.

4. A method according to claim 1, wherein the threshold specifies a speed of the mobile device.

5. A method according to claim 1, further comprising:
    reporting the event to a service controller; and
    storing the event in the device profile.

6. A method according to claim 1, wherein the environmental parameter includes at least one of a geographic location of the mobile device.

7. A method according to claim 1, further comprising:
    determining a group profile to which the device profile belongs, the group profile including a more than one device profile, the group profile specifying at least one feature configuration setting and threshold for the more than one device profile.

8. A method according to claim 1, wherein the monitoring includes receiving sensor data related to the environmental parameter from at least one of at least one sensor of the mobile device or a motor vehicle in which the mobile device is located.

9. An apparatus comprising:
    at least one processor; and
    at least one memory including computer program code for one or more programs,
    the at least one memory and the computer program code configured to, with the at least one processor, cause the apparatus to perform at least the following,
    monitor at least one environmental parameter of a mobile device;
    determine context information of the mobile device, the context information comprising a legal speed limit of an automobile for a geographic location of the mobile device and weather conditions for the geographic location of the mobile device;
    determine a threshold based on the context information;

determine an event according to the threshold, the event being further based on at least a change in the at least one environmental parameter;

store the event within an event history associated with the mobile device;

determine a feature configuration setting associated with the event according to a device profile, wherein the feature configuration setting includes at least one of locking the mobile device, limiting access to at least one predetermined application, or disabling the mobile device; and cause the mobile device to change a feature configuration according to the feature configuration setting, wherein the threshold is dynamically changed based on the weather conditions.

10. An apparatus according to claim 9, wherein the apparatus is further caused to:
update the device profile.

11. An apparatus according to claim 9, wherein the device profile includes additional thresholds and feature configuration settings, and the additional thresholds are predetermined or configured to be dynamically changed based on the context information.

12. An apparatus according to claim 9, wherein the threshold specifies a speed of the mobile device.

13. An apparatus according to claim 12, wherein the apparatus is further caused to:
report the event to a service controller; and
store the event in the device profile.

14. An apparatus according to claim 9, wherein the environmental parameter includes at least one of a geographic location of the mobile device.

15. An apparatus according to claim 9, wherein the apparatus is further caused to:
determine a group profile to which the device profile belongs, the group profile including a more than one device profile, the group profile specifying at least one feature configuration setting and threshold for the more than one device profile.

16. An apparatus according to claim 9, wherein the apparatus is further caused to:
receive sensor data relating to the environmental parameter from at least one of at least one sensor of the mobile device or a motor vehicle in which the mobile device is located.

17. A system comprising:
a database configured to store a device profile, wherein the device profile specifies a context information of the mobile device, and a feature configuration setting that includes at least one of locking the mobile device, limiting access to at least one predetermined application, or disabling the mobile device; and a service controller platform configured to monitor at least one environmental parameter of the mobile device; determine the context information of the mobile device, the context information comprising a legal speed limit of an automobile for a geographic location of the mobile device, and weather conditions for the geographic location of the mobile device,; determining a threshold based on the context information; determine an event according to the threshold, the event being further based on at least a change in the at least one environmental parameter; store the event within an event history associated with the mobile device; determine the feature configuration setting associated with the event according to the device profile; and cause the mobile device to change a feature configuration according to the feature configuration setting, wherein the threshold is dynamically changed based on the weather conditions.

* * * * *